INVENTORS
MARTIN KAY
THOMAS McCALLUM

BY
ATTORNEY

INVENTORS
MARTIN KAY
THOMAS McCALLUM
BY
ATTORNEY

United States Patent Office 3,317,805
Patented May 2, 1967

3,317,805
VARIABLE FREQUENCY POWER SUPPLIES FOR ELECTRIC MOTOR
Martin Kay, Wilton, Conn., and Thomas McCallum, Bedford, N.Y., assignors to American Machine & Foundry Company, a corporation of New Jersey
Filed Oct. 22, 1963, Ser. No. 318,049
11 Claims. (Cl. 318—231)

This invention relates to high precision variable frequency power supplies. While not limited thereto, the invention also relates to variable frequency power supplies which can be numerically controlled to provide an output frequency which changes at a desired rate between a preselected starting frequency and a preselected terminating frequency and which further can be adapted to achieve precision speed control of an A.C. motor.

There has been a continuing need for high precision variable frequency power supplies capable of providing a signal having a frequency controlled to within a few hundredths of 1% of any preselected frequency over a relatively wide range, i.e., where the highest frequency is several times the lowest frequency. Prior systems have generally included variable frequency oscillators which are controlled by means of an analog feedback log loop operating in conjunction with a voltage reference. These prior systems, while satisfactory for many installations, have generally been incapable of achieving truly high precision control due to the inherent limitations of analog control systems and the difficulties experienced in controlling frequency by means of voltage standards.

In many installations, particularly where the control of automatic machinery is involved, it is desirable that the variable frequency power supply be programmable in accordance with numerical data which can be derived from punch cards, magnetic tapes, or the like. In other words, the variable frequency power supply should be capable of providing an output signal of a preselected frequency corresponding to a numerical instruction, capable of thereafter changing the output frequency at a preselected rate in accordance with another numerical instruction, and, finally, be capable of providing a termination signal when the output frequency reaches a certain preselected value. It is apparent that a variable frequency power supply with these capabilities is completely versatile, since, for example, the power supply could be programmed to start from a first frequency, change at a preselected rate until a second frequency is reached, then change at a different preselected rate until a third frequency is reached, etc., thereby achieving any desired control pattern. This type of numerical control is difficult to achieve with prior analog type variable frequency systems, and cannot be achieved with a high degree of precision in these prior systems.

One use for high precision variable frequency power supplies is in precision motor control systems such as, for example, those used to control the reeling of extruded threads. In such systems, the speed at which the reel rotates determines the speed at which the thread is drawn through a die member, which in turn determines the thread diameter. If the thread diameter is to remain constant, the tangential thread velocity at the reel must remain constant regardless of the reel diameter, which varies in accordance with the number of layers of thread wound thereon. It is well known that the speed of rotation of an A.C. motor is directly proportional to the frequency of the applied electrical power. If the power applied to the motor initially has a certain frequency which is thereafter decreased at a preselected rate, the tangential velocity at the reel can be maintained constant. If the variable frequency power supply is sufficiently accurate and properly programmed, there will be no significant variation in the thread diameter.

Thus, an object of this invention is to provide a precision variable frequency power supply capable of providing any desired preselected frequency within a relatively wide range of frequencies.

Another object of this invention is to provide a variable frequency power supply including a crystal controlled frequency standard wherein each of the possible output frequencies has a predetermoined fixed relationship to the frequency standard.

Another object of this invention is to provide a variable frequency power supply which achieves incremental increases or decreases in the output frequency in response to successive pulses applied thereto.

Yet another object of this invention is to provide a variable frequency power supply which is capable of providing an output signal at a frequency which changes at a preselected rate.

It is another object of this invention to provide a programmable variable frequency power supply which initially provides an output signal of a frequency corresponding to a first numerical instruction, thereafter changes the frequency of the output signal at a preselected rate in accordance with another numerical instruction, and provides a termination signal when the output frequency has reached a different preselected frequency corresponding to a third numerical instruction.

Still another object is to provide a high precision variable speed motor control system.

The variable frequency power supply system in accordance with this invention includes a crystal controlled oscillator connected to a plurality of serially connected frequency dividers so that each frequency divider provides a pulse train having a different repetition rate, and so that none of the pulses provided are coincident in time. These pulse trains are applied to individual gating circuits and then to a combining circuit which provides the output signal. The number of pulses in the output signal (over a predetermined period of time) depends upon which pulse train, or combination of pulse trains, is applied to the combining circuit and, hence, the output frequency is controlled by selective control of the gating circuits.

A binary counter is used to condition selected ones of the gating circuits, so that the output frequency is a function of the count established in the binary counter. When a pulse is applied to the binary counter, the count therein is changed, thereby bringing about an incremental change in the output frequency. A slope generator in accordance with this invention can be utilized to apply pulses to the binary counter at a preselected rate so that the output frequency changes at a corresponding preselected rate. The initial count in the binary counter, and hence the initial output frequency, can be established in accordance with a first numerical instruction received from a punch card or the like; the rate at which pulses are applied to the binary counter, and hence the rate at which the output frequency changes, can be controlled via the slope generator in accordance with another numerical instruction; and a word recognizer can be used to provide a termination signal when the count in the binary counter is equal to a third numerical instruction. Thus, the power supply system is completely programmable.

For some installations, the output signal from the combining circuit can be used directly. For motor control systems, this output signal can be reduced further in frequency and then be utilized to control a power inverter circuit which supplies the high power requirements of the electric motor at a frequency proportional to the frequency of the output signal. Where a three-phase motor is controlled, it is necessary to further include a converter circuit which provides the three-phase signal to synchronize operation of the power inverter. In these motor control systems, an additional circuit is included to vary the magnitude of the potential applied to the motor in accordance with the frequency to compensate for changes in inductive reactance caused by changes in frequency.

The following specification, of which the accompanying drawings form a part, explains the manner in which the foregoing objects are attained in accordance with this invention. In the drawings:

FIG. 8 is a diagram illustrating the manner in which the three-phase signal is derived for control of the inverter circuit.

System Generally

Figure 1:
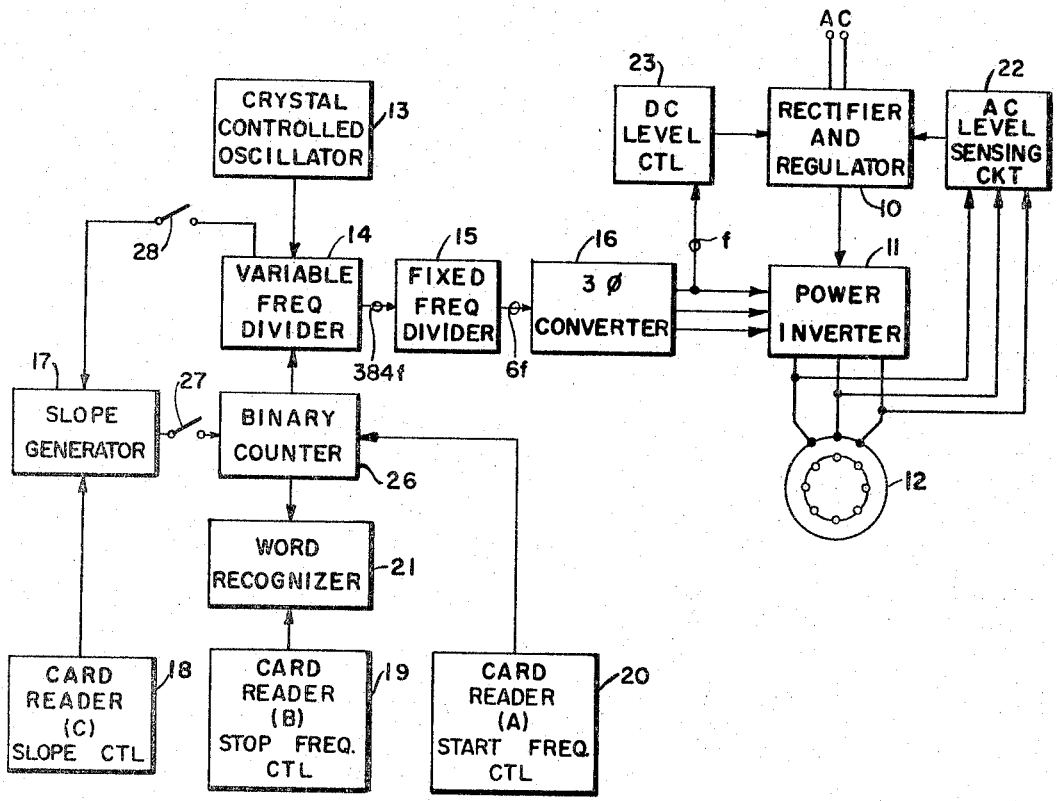
FIG. 1 is a block diagram illustrating a programmable variable frequency system in accordance with this invention adapted to control the speed of a motor.

The over-all system is illustrated in FIG. 1 and is shown adapted to control a three-phase induction motor 12. A rectifier and regulator circuit 10 is connected to a suitable A.C. source and provides a controlled D.C. potential to a power inverter circuit 11. The inverter circuit includes a number of semiconductor switches arranged to provide three-phase square wave power to motor 12 at a selected frequency.

The apparatus for providing the variable frequency signal for controlling inverter circuit 11 includes a crystal controlled oscillator 13, preferably of the type which provides a fixed frequency square wave output signal in the range of 100 kilocycles. Oscillator 13 is connected to a variable frequency divider 14 which in turn is connected to provide an output signal to a fixed frequency divider 15. A binary counter 26 is connected to control the operation of variable frequency divider 14, so that the frequency division achieved by means of the variable frequency divider is in accordance with the count established in the binary counter. Thus, the output signal from the variable frequency divider can be at any one of a number of discrete frequencies, each such frequency having a precise relationship to the frequency of the crystal controlled oscillator 13. The frequency stability of crystal controlled oscillators is well known, and therefore each of the discrete output signals from variable frequency divider 14 has a precise frequency value. As will be described hereinafter in greater detail, a sufficiently large number of discrete frequencies are provided by the variable frequency divider so that an output frequency can be selected which is within a few hundredths of 1% of any desired frequency within the operating range.

For some installations, the output signal from variable frequency divider 14 may be used directly, but for motor control purposes it is desirable to further reduce the frequency of this output signal. As shown in FIG. 1, the frequency of the signal provided by the variable frequency divider is 384 times the operating frequency, $f$, of motor 12 and is further divided by a factor of 64 by fixed frequency divider 15. The resulting signal provided by the fixed frequency divider is at 6 times the operating frequency of motor 12, and is applied to a three-phase converter circuit 16. The converter circuit further divides the frequency and provides three separate square wave signals having a 120° phase relationship with respect to one another, or, in other words, the converter circuit provides a three-phase signal suitable for controlling power inverter 11.

The inductive reactance of the motor windings varies as a function of frequency, and therefore it is necessary to vary the potential applied to the motor as a function of applied frequency in order to maintain proper operating conditions. A D.C. level control circuit 23 is connected to one output of three-phase converter 16 and provides a D.C. signal to the regulator circuit 10 which is proportional to the operating frequency $f$. An A.C. level sensing circuit 22 is connected across the motor windings and provides a D.C. potential to the regulator circuit which is proportional to the A.C. potential across the motor windings. Regulator circuit 10 is then automatically operable to adjust the potential provided to the power inverter circuit so that the A.C. potential across the motor windings is proportional to the D.C. potential provided by level control circuit 23, and, hence, the potential applied to the motor windings is appropriately varied in accordance with applied frequency.

A slope generator circuit 17 is employed to supply pulses to binary counter 26 at a selected rate via a switch 27. Each applied pulse changes the count in binary counter 26, thereby bringing about a corresponding incremental change in the output frequency provided by variable frequency divider 14. Accordingly, by accurately controlling the rate at which pulses are applied to binary counter 26, accurate control of the rate at which the output frequency changes is achieved. Slope generator 17 includes a variable frequency divider which can be operated directly from the crystal controlled oscillator 13, but it is preferable that a lower frequency timing signal be utilized, which can easily be derived from variable frequency divider 14 via a switch 28. In any event, the rate at which pulses are applied to binary counter 26 is precisely related to the crystal controlled oscillator output frequency, and therefore this pulse rate can be precisely controlled.

Figure 2:
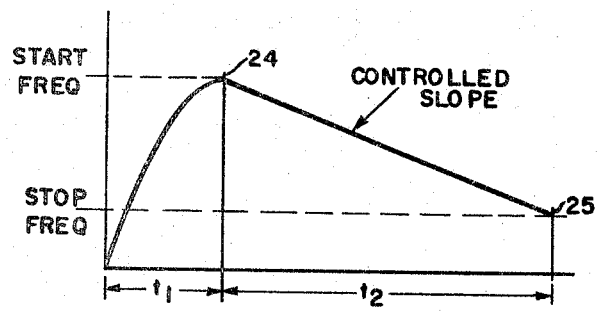
FIG. 2 is a diagram illustrating a motor control pattern which can be approximated by the system shown in FIG. 1.

FIG. 2 illustrates a motor control pattern which can be approximated by means of the system shown in FIG. 1. During a time interval $t_1$, the motor is energized at a particular frequency so that the motor can be brought up to the initial running speed. This is accomplished by placing a selected number in binary counter 26 while leaving switches 27 and 28 in the open position so that the slope generator is inoperative. At point 24, when the motor is at the initial running speed synchronous with the initial applied frequency, switches 27 and 28 are closed so that the applied frequency and motor speed are gradually decreased during time interval $t_2$ at a rate controlled by the slope generator. Sometime thereafter, at point 25, the applied frequency will have been reduced to a lower value, which signals termination of the operation.

The system shown in FIG. 1 can be programmed to automatically provide any desired motor control pattern, such as the pattern illustrated in FIG. 2. The numerical control information is stored on punch cards and extracted therefrom by means of conventional card readers 18, 19 and 20. In practice, all of the information would be stored on a single punch card and a single card reader would be employed capable of providing three separate numerical instructions. The (A) card reader 20 provides a first numerical instruction corresponding to a preselected starting frequency or starting motor speed, and is connected to establish a binary count in binary counter 26 equal to the first numerical indication. The (B) card reader 19 provides a second numerical instruction corresponding to a preselected termination frequency or termination motor speed. A conventional word recognizer circuit 21, capable of comparing two binary numbers, is connected between binary counter 26 and the (B) card reader and is operative to provide a termination signal when the count in binary counter 26 is equal to the second numerical indication. The (C) card reader 18 provides a third numerical instruction corresponding to a preselected slope between the points 24 and 25 (FIG. 2) and is connected to control the operation of slope generator 17 so that the rate at which pulses are applied to binary counter 27 is in accordance with the third numerical indication.

It should be noted that this programmable system is completely versatile. The starting and terminating frequencies can be selected values anywhere within the operating range, and the selected slope can be any desired value, either positive or negative. For more complex control patterns, the system could be programmed so that when a first termination frequency is reached, different numerical instructions are inserted in card readers 18 and 19 so that the output frequency begins to change at a different rate toward another termination frequency, and so on. Where a constant output frequency is desired for a period of time, this can be accomplished by means of auxiliary apparatus which momentarily disables the slope generator, or by selecting a slope having a very low value, thereby maintaining the output frequency essentially constant.

Variable frequency divider and binary counter

Figure 3:
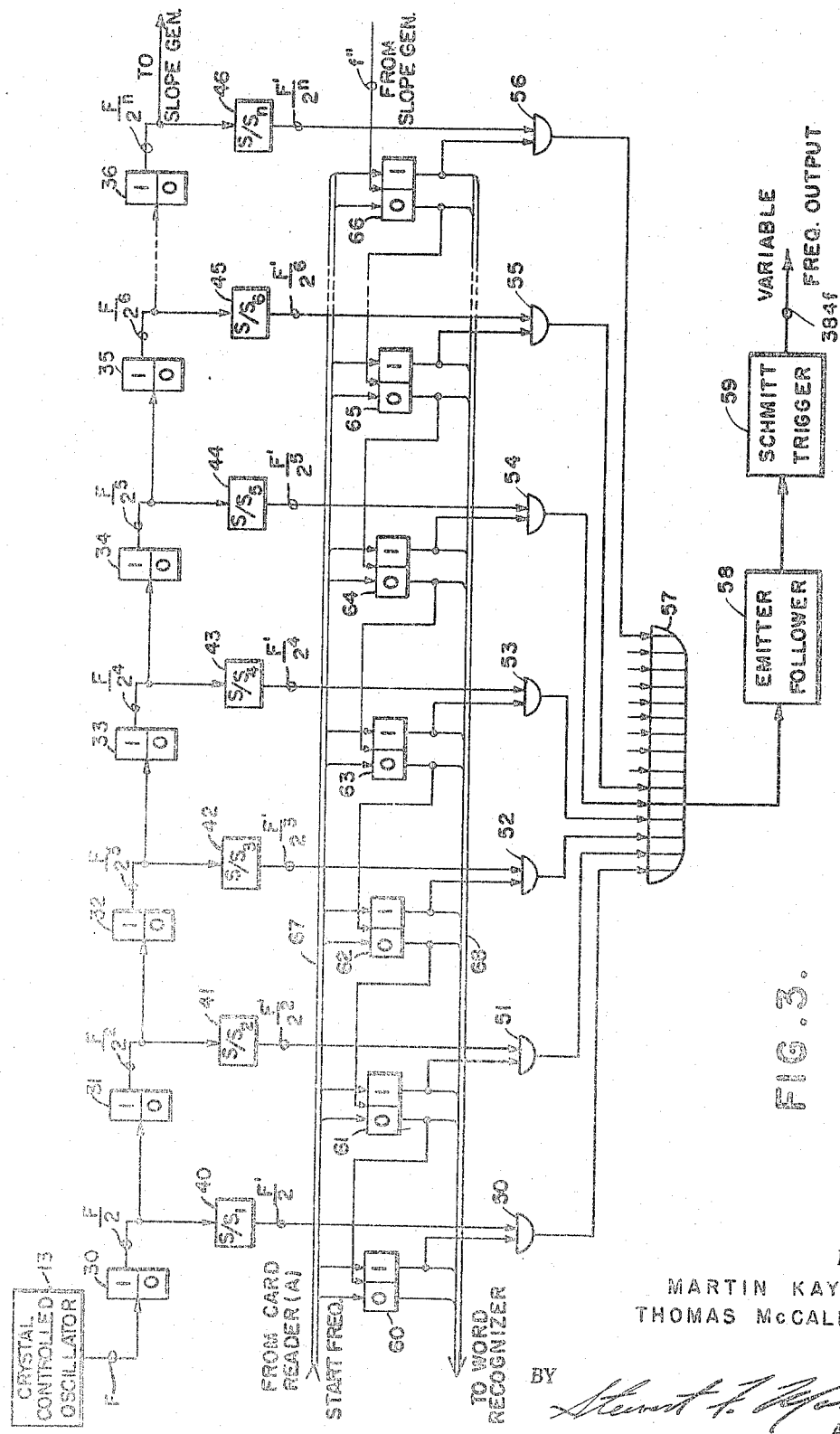
FIG. 3 is a schematic diagram of the variable frequency divider portion of the system.

The variable frequency divider, and associated binary counter which controls the variable frequency divider, are shown schematically in FIG. 3. The variable frequency divider includes a plurality of serially connected flip-flop circuits 30–36 connected to receive the output signal from crystal controlled oscillator 13. More specifically, the output signal from crystal controlled oscillator 13 is connected to the symmetrical input of a flip-flop circuit 30, the set output of flip-flop circuit 30 is connected to the symmetrical input of flip-flop circuit 31, the set output of flip-flop circuit 31 is connected to the symmetrical input of flip-flop circuit 32, etc. The set output of each of the flip-flop circuits 30–36 is connected to one input of an associated AND circuit 50–56 via an associated single shot multivibrator circuit 40–46. The output from each of the AND circuits 50–56 is connected to an individual input of an OR circuit 57. Flip-flop circuits 30–36 are designed to change to the alternate one of their stable states in response to a negative going potential applied at the symmetrical input. The single shot multivibrator circuits are designed to provide a short output pulse in response to a positive going potential applied at the input. The AND circuits, when conditioned by a potential applied to the other input, permit the pulses from the single shot multivibrator circuit to pass through to OR circuit 57, where these pulses are combined with pulses from other AND circuits to provide a single output pulse train.

Figure 6A:
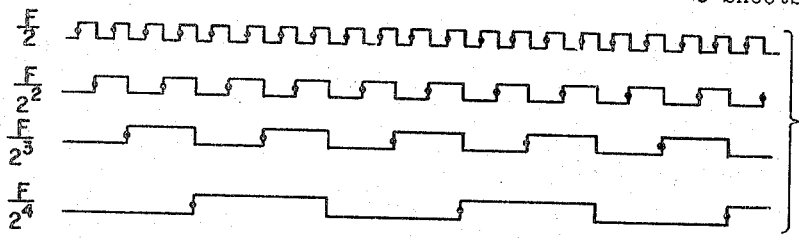
FIGS. 6a–6c are diagrams illustrating the relationship of various pulses produced by the variable frequency divider portion of the system.

If the operating frequency of oscillator 13 is F, then the output signal from flip-flop circuit 30 is a square wave at a frequency $F/2$, and is as shown in FIG. 6a. The remaining flip-flop circuits 31–36 each divide the frequency in half. Accordingly, flip-flop circuit 31 provides a square wave output signal at a frequency $F/2^2$; flip-flop circuit 32 provides a square wave output signal at a frequency $F/2^3$; and flip-flop circuit 33 provides a square wave output signal at a frequency $F/2^4$, these signals also being shown in FIG. 6a. The specific phase relationship between the waveforms shown in FIG. 6a should be noted. As previously mentioned, the flip-flop circuits change to the alternate state in response to a negative going potential applied at the symmetrical input. Therefore, when flip-flop circuit 30 changes from the set to the reset state, flip-flop circuit 31 will change to the alternate state. Similarly, when flip-flop circuit 31 changes from the set to the reset state, flip-flop circuit 32 will change to the alternate state. The remaining flip-flop circuits each operate in essentially the same fashion with respect to the flip-flop circuit in the previous stage.

Figure 6B:
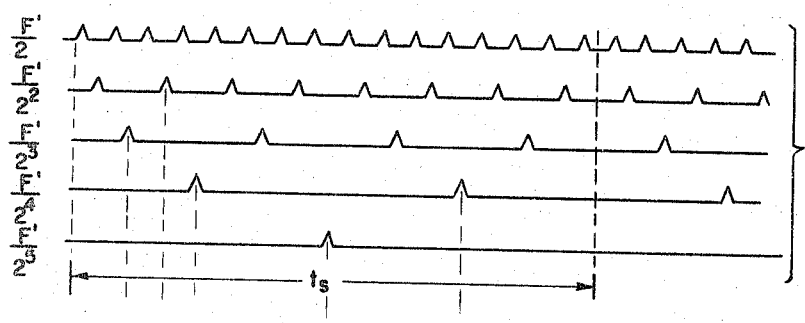

Multivibrator circuit 40 is responsive to the positive going portion of the output signal from flip-flop circuit 30, these positive going portions of the signal being marked by the dots in FIG. 6a. In response to each such positive change of potential, multivibrator circuit 40 provides a short pulse, and therefore a pulse train designated $F'/2$, as shown in FIG. 6b, emerges from multivibrator circuit 40. Multivibrator circuit 41 is similarly connected to flip-flop circuit 31 and provides the pulse train designated $F'/2^2$; and in similar fashion multivibrator circuit 42, 43, and 44 are connected to flip-flop circuits 32, 33, and 34, respectively, to provide the corresponding pulse trains designated $F'/2^3$, $F'/2^4$, $F'/2^5$, as shown in FIG. 6b. The time constants of multivibrator circuits 40–46 are each adjusted so that the resulting output pulses are each of approximately the same duration, and so that the duration of each of the pulses is substantially less than the half-cycle duration of the signal provided by flip-flop circuit 30. It is significant to note in FIG. 6b that none of the pulses of any one of the pulse trains is coincident in time with any of the pulses of any of the other pulse trains. Although only five of the pulse trains are shown in FIG. 6b, it should be noted that other pulse trains from the remaining multivibrator circuits will also include only noncoincident pulses. It should also be noted that the oscillating frequency of the crystal controlled oscillator is an exact mutliple of the frequency of each of the pulse trains provided by multivibrator circuits 40–46.

There are other circuit arrangements which will achieve the same noncoincident pulse displacements as shown in FIG. 6b. For example, if the flip-flop circuits are responsive to a change of potential in the same direction as the multivibrator circuits, i.e., either positive going change of potential, or the negative going change of potential, then the circuits must be connected to different outputs from the associated flip-flop circuit. More specifically, if flip-flop circuit 31 and multivibrator circuit 40 are both responsive to a positive going change of potential, for example, then the reset output of flip-flop circuit 30 should be connected to the symmetrical input of flip-flop circuit 31 is the set output is connected to the input of multivibrator circuit 40. The remaining flip-flop circuits and multivibrator circuits would be connected in similar fashion. On the other hand, if the flip-flop circuits are responsive to a change of potential in one direction, and the multivibrator circuit is responsive to a change of potential in the opposite direction, then both of these circuits must be connected to the same output from the associated flip-flop circuit. This is the situation previously described in connection with FIG. 3 where the flip-flop circuits are responsive to a negative going change in potential and the multivibrator circuits are responsive to a positive going change of potential.

Figure 6C:
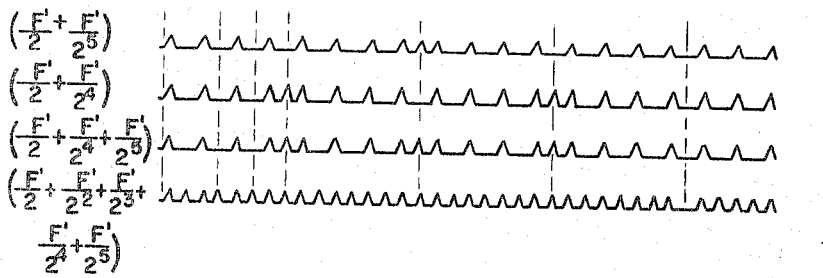

AND circuits 50–56 are gating circuits which permit selective ones of the pulse trains from multivibrator circuits 40–46 to pass through to OR circuit 57. OR circuit 57 is a combining circuit which provides a single output pulse train including pulses corresponding in time to each of the pulses applied to the various inputs of the OR circuit. Therefore, since the various pulses of the individual pulse trains are noncoincident in time, each of these pulses will have a corresponding pulse in the pulse train developed at the output of OR circuit 57. Various ones of the possible pulse trains which could appear at the output of OR circuit 57 are illustrated in FIG. 6c, which has the same time scale as FIG. 6b and FIG. 6a. The top line in FIG. 6c illustrates the pulse train which results when AND circuits 50 and 54 are conditioned, thereby applying pulse trains $F'/2$ and $F'/2^5$ to OR circuit 57. The output pulse train resulting when AND circuits 50 and 53 are conditioned is illustrated in the second line, the pulse train which results when AND circuits 50, 53, and 54 are conditioned is shown in the third line, and the pulse train resulting when AND circuits 50, 51, 52, 53, and 54 are conditioned is shown in the bottom line. It should be noted that the number of pulses in the output pulse train (over a predetermined period of time) is different for each of the different combinations of pulse trains, and, hence, each of the different output pulse trains has a different basic frequency.

Table I illustrates the relationship between various combinations of conditioned AND circuits and the corresponding number of output pulses appearing in the pulse train developed at the output of OR circuit 57. Table I has been compiled considering only AND circuits 50–54 and the number of pulses occurring during a time interval $t_S$ (FIG. 6). In Table I, a "1" indicates that an AND circuit is conditioned and permits the corresponding pulse train to pass through, and a "0" indicates that the AND circuit is not conditioned and therefore the associated pulse train is not applied to OR circuit 57. During the time interval $t_S$, the pulse train which could pass through AND circuit 50 includes sixteen pulses, that which could pass through AND circuit 51 includes eight pulses, that which could pass through AND circuit 51 includes four pulses, that which could pass through AND circuit 53 includes two pulses, and that which could pass through AND circuit 54 includes one pulse. Therefore, as indicated on the first line of Table I, if AND circuits 50–54 are all conditioned, the pulse train would include 31 pulses. The second line indicates that if all of the AND circuits except AND circuit 54 are conditioned, the output pulse train includes 30 pulses, the third line indicates that if all the AND circuits except AND circuit 53 are conditioned, the output pulse train includes 29 pulses, etc.

TABLE I

| | AND Circuit 50 | AND Circuit 51 | AND Circuit 52 | AND Circuit 53 | AND Circuit 54 | Number of Pulses in Time $t_s$ |
|---|---|---|---|---|---|---|
| 1 | 1 | 1 | 1 | 1 | 1 | 31 |
| 2 | 1 | 1 | 1 | 1 | 0 | 30 |
| 3 | 1 | 1 | 1 | 0 | 1 | 29 |
| 4 | 1 | 1 | 1 | 0 | 0 | 28 |
| 5 | 1 | 1 | 0 | 1 | 1 | 27 |
| 6 | 1 | 1 | 0 | 1 | 0 | 26 |
| 7 | 1 | 1 | 0 | 0 | 1 | 25 |
| 8 | 1 | 1 | 0 | 0 | 0 | 24 |
| 9 | 1 | 0 | 1 | 1 | 1 | 23 |
| 10 | 1 | 0 | 1 | 1 | 0 | 22 |
| 11 | 1 | 0 | 1 | 0 | 1 | 21 |
| 12 | 1 | 0 | 1 | 0 | 0 | 20 |
| 13 | 1 | 0 | 0 | 1 | 1 | 19 |
| 14 | 1 | 0 | 0 | 1 | 0 | 18 |
| 15 | 1 | 0 | 0 | 0 | 1 | 17 |
| 16 | 1 | 0 | 0 | 0 | 0 | 16 |
| 17 | 0 | 1 | 1 | 1 | 1 | 15 |
| 18 | 0 | 1 | 1 | 1 | 0 | 14 |
| 19 | 0 | 1 | 1 | 0 | 1 | 13 |
| 20 | 0 | 1 | 1 | 0 | 0 | 12 |

It should be noted that the binary number 11111 appearing in the first line of the table is equal to 31, the binary number 11110 appearing in the second line is equal to 30, and so on. Accordingly, there is a precise relationship between the binary numbers set forth in Table I and the number of pulses appearing in the output pulse train over a predetermined time interval, and therefore the output frequency has a precise relationship to these binary numbers. Accordingly, a binary counter including flip-flop circuits 60–66 is connected to selectively condition AND circuits 50–56.

The set output of flip-flop circuit 66 is connected to one input of AID circuit 56 to condition the AND circuit when the flip-flop circuit is in the set state, thereby permitting the pulse train from multivibrator circuit 46 to pass through to OR circuit 57. Similarly, the set outputs from flip-flop circuits 60–65 are connected to one input of AND circuit 50–55, respectively. The reset output from flip-flop circuit 66 is connected to the symmetrical input of flip-flop circuit 65, and in like fashion the set outputs from flip-flop circuits 65–60 are connected to the symmetrical inputs of the adjacent flip-flop circuits 64–60, respectively. The (A) card reader 20 (FIG. 1) is connected to the set and reset inputs of each of the flip-flop circuits 60–66 via a cable 67. Card reader (A) provides a numerical instruction corresponding to a preselected starting frequency and by means of suitable controls in the card reader selected ones of flip-flop circuits 60–66 can be placed in the "1" state, thereby establishing a count in the binary counter equal to the numerical instruction provided by the card reader. The set and reset outputs of each of the flip-flop circuits 60 is connected to word recognizer 21 (FIG. 1) via a cable 68. Thus, the word reader can sense the count in the binary counter and provides a termination signal when this count is equal to the numerical instruction provided by the (B) card reader 19 (FIG. 1).

It should be noted that flip-flop circuits 60–66 provide a counter which counts in the reverse direction, i.e., which counts toward zero, as successive pulses are applied to flip-flop circuit 66. Thus, regardless of the initial count established in the binary counter, successive pulses applied to the input of flip-flop circuit 66 will each reduce the count in the binary counter by one digit. It should be noted, by referring to Table I, that each successive reduction in the count established in the binary counter reduces the output frequency at OR circuit 57 by one increment.

The variable frequency divider shown in FIG. 3 includes six stages, but it should be clear that this frequency divider could include any desired number of stages. The highest possible output frequency emerging from OR circuit 57 is slightly less than the operating frequency $F$ of oscillator 13. The lowest possible frequency is $F/2^n$, where $n$ is equal to the number of stages. Even more significant, the various discrete output frequencies which can be obtained differ from one another by a factor of $F/2^n$. Thus, if the oscillator frequency is, for example, 100 kilocycles and there are fifteen frequency divider stages, there are approximately 33,000 (actually $2^{15}$ or 32,768) possible discrete output frequencies, and these frequencies will differ from one another by increments of approximately 3 cycles per second.

It should be noted that the percent of change at the low end of the range is substantially higher than at the high end of the range. In other words, at the low end of the range, the change from the lowest frequency of 3 cycles to the next higher frequency of 6 cycles is a change of approximately 100%. On the high end of the range, however, the change from approximately 100 kilocycles to a frequency 3 cycles less is a very small percentage change. Accordingly, the upper portion of the range is more commonly useful than is the lower portion of the range.

The output of OR circuit 57 is connected to an emitter follower circuit 58, which in turn is connected to a Schmitt trigger circuit 59. The emitter-follower circuit increases the magnitude of the output pulses, and the Schmitt trigger circuit performs the function of restoring a desired wave shape to these pulses. The variable frequency output signal then appears at the output of trigger circuit 59.

*Slope generator*

Figure 4:
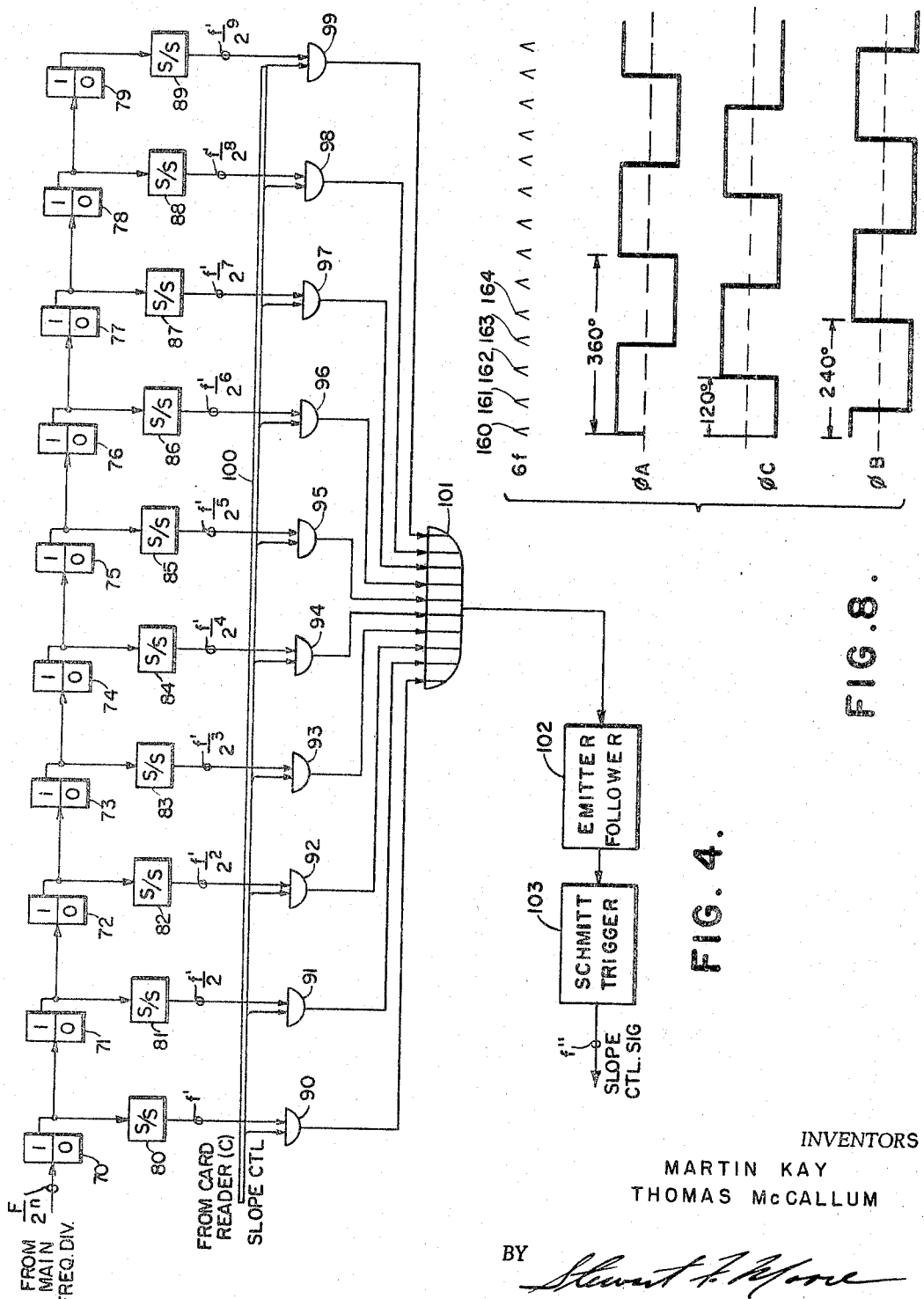
FIG. 4 is a schematic diagram of the slope generator portion of the system.

The slope generator is illustrated schematically in FIG. 4 and includes a variable frequency divider similar to that previously described in FIG. 3. The slope generator provides the pulses which are applied to the symmetrical input of flip-flop circuit 66 in FIG. 3 so that these pulses can periodically change the count established in the binary counter. Accordingly, the rate at which the pulses are applied to the binary counter determines the rate which the output frequency from trigger circuit 59 (FIG. 3) changes.

The variable frequency divider of the slope generator includes a plurality of flip-flop circuits 70–79 interconnected with associated single shot multivibrator circuits 80–89, and AND circuits 90–99. The AND circuits are connected to an OR circuit 101 which provides a single output pulse train having a fundamental frequency depending upon which of the AND circuits is conditioned. Since this frequency divider system operates essentially the same as that previously described in FIG. 3, it is not necessary to describe the operation of this circuit in detail. It should be noted, however, that the slope generator does not include a binary counter for selectively conditioning AND circuits 90–99 as is the case in FIG. 3. Instead, the (C) card reader 18 is directly connected to one input of each of the AND circuits via a cable 100 to condition selective ones of these AND circuits in accordance with a binary instruction derived from the punch card in the card reader.

It is desirable that the rate at which pulses are applied to the binary counter in FIG. 3 be substantially lower than the rate at which pulses emerge from OR circuit 57, and therefore flip-flop circuit 70 derives its timing signal from one of flip-flop circuits 30–36, such as flip-flop circuit 36 (FIG. 3) as indicated in the drawings. Thus, if the variable frequency divider in FIG. 3 includes fifteen stages, and the oscillator frequency is 100 kilocycles, the input signal applied to flip-flop circuit 70 will be at a frequency of approximately three cycles per second. The variable frequency divider in FIG. 4 includes ten stages and therefore multivibrator circuit 89 will provide one pulse approximately every 300 seconds. Under these circumstances, the rate at which pulses are applied to the binary counter can be varied between three pulses per second and one pulse every 300 seconds, in approximately 1,000 equal increments (actually $2^{10}$ or 1,024 increments).

The output of OR circuit 101 is connected to the symmetrical input of flip-flop circuit 66 (FIG. 3) via an emitter follower circuit 102 and a Schmitt trigger circuit 103. The emitter follower circuit increases the magnitude of the output pulses from OR circuit 101, and the Schmitt trigger circuit acts as a pulse shaper.

Figure 7A:
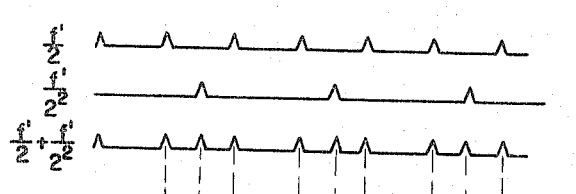
FIGS. 7a and 7b are diagrams illustrating the manner in which changes in the output frequency are controlled by the slope generator portion of the system.
Figure 7B:
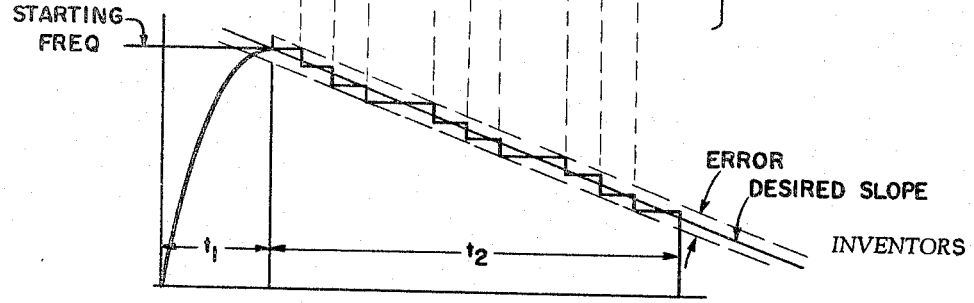

The manner in which the slope generator circuit shown in FIG. 4 approximates the characteristic in FIG. 2 is illustrated in FIGS. 7a and 7b. Assume that AND circuits 91 and 92 are conditioned and that, therefore, the pulse trains $f'/2$ and $f'/2^2$ are applied to OR circuit 101. These pulse trains are illustrated in the first two lines in FIG. 7a, and when combined by OR circuit 101, they result in a pulse train as illustrated in the lower line of FIG. 7a. Each time one of these pulses is applied to the binary counter, the output frequency at OR circuit 57 is reduced to the next lower one of the possible output frequencies. The pulses applied to the binary counter are not equally spaced, and therefore the output frequency is reduced step-by-step in the manner shown in FIG. 7b. The ideal situation is when the output frequency decreases gradually in accordance with the line designated "desired slope." The maximum deviation from this desired slope is indicated by the dotted lines and is the percentage of error. It has been found that, if the main frequency divider in FIG. 3 includes fifteen stages, and the slope generator frequency divider in FIG. 4 includes ten stages, any desired slope can be achieved with less than .05 of 1% error. FIGS. 7a and 7b have the same time scale to illustrate the relationship between the slope generator pulses and the changes in output frequency. The incremental changes in output frequency, as shown in FIG. 7b, are greatly magnified for illustrative purposes.

Motor Control Circuits

Figure 5:
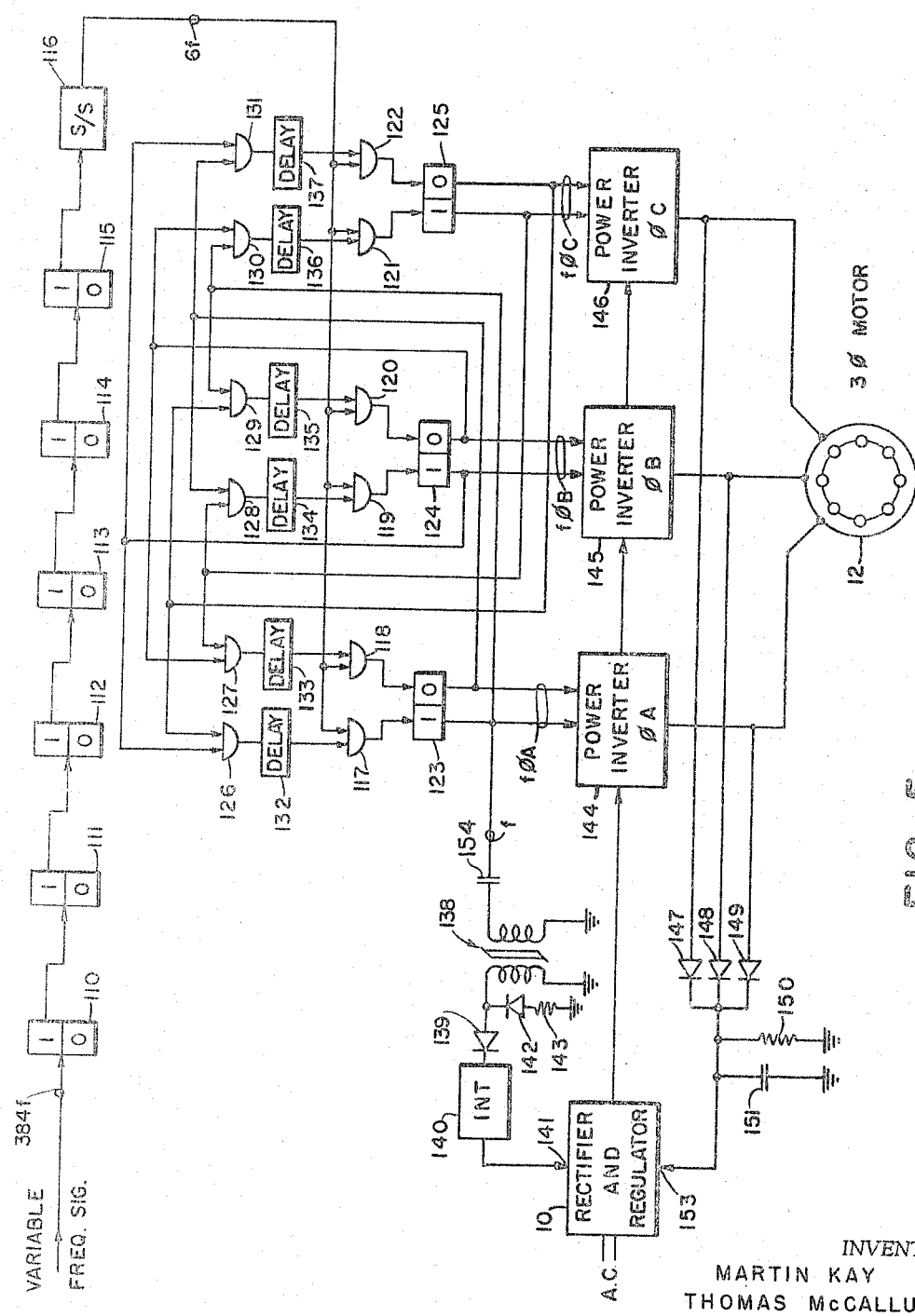
FIG. 5 is a schematic diagram of the power inverter and level control portion of the system.

Referring now to FIG. 5, the variable frequency signal $384f$ is applied to the symmetrical input terminal of a flip-flop circuit 110, which is the first of a series of six identical flip-flop circuits 110–115 of the fixed frequency divider 15 (FIG. 1). Each of the circuits 110–115 is designed having two stable states, referred to as the "1" or set state and the "0" or reset state. The flip-flop circuits change from their present state to the other state when a negaive going change of potential appears at the symmetrical input terminal. Thus, at the end of positive input pulses, flip-flop circuit 110 will change state. Assuming flip-flop circuit 110 is initially in the set state, a pulse supplied to its input terminal will cause that circuit to change to the reset or "0" state, thereby producing a signal which will cause flip-flop circuit 111 to also change state. A second positive pulse will cause flip-flop circuit 110 to change from the "0" state back to the "1" state, but this output will cause no change in flip-flop circuit 111. It is therefore obvious that flip-flop circuit 111 will change state once for each two changes of flip-flop circuit 110; that flip-flop circuit 112 will change once for each two changes of flip-flop circuit 111, or four changes of flip-flop circuit 110, etc. The input frequency to flip-flop circuit 110 will then be divided a factor of two by each of the flip-flop circuits 110–115. Accordingly, flip-flop circuits 110–115 divide the signal, $384f$, by a factor of sixty-four, and therefore the signal emerging from flip-flop circuit 115 is at a frequency $6f$. This signal is supplied to a single shot multivibrator circuit 116, the output of which is at the same frequency $6f$. The time constant of multivibrator circuit 116 is adjusted so that a train of relatively short pulses will emerge.

The output of multivibrator circuit 116 is connected to one input of each of the AND circuits 117–122. The outputs from AND circuits 117, 119 and 121 are connected, respectively, to the set inputs of flip-flop circuits 123, 124 and 125, and the outputs from AND circuits 118, 120 and 122 are connected, respectively, to the reset inputs of flip-flop circuits 123, 124 and 125. The outputs from each of flip-flop circuits 123–125 are connected to power inverter circuits 144–146, respectively.

The set output of flip-flop circuit 123 is also connected to condition one input of AND circuits 129 and 130, whereas the reset output thereof is connected to one input of AND circuits 128 and 131. The set output of flip-flop circuit 124 is connected to one input of AND circuit 126 and the other input of AND circuit 131, whereas the reset output thereof is connected to one input of AND circuit 127 and the other input of AND circuit 130. The set output of flip-flop circuit 125 is connected to the remaining input of AND circuits 127 and 128, and the reset output is connected to the remaining inputs of AND circuits 126 and 129. The outputs of AND circuits 126–131 are connected to the remaining inputs of AND circuits 117–122, respectively, via respective time delay circuits 132–137.

The operation of this portion of the circuit can best be described with the aid of the Table II below, wherein the symbols $A_1$ and $A_0$ refer, respectively, to the "1" and "0" states of flip-flop circuit 123, associated with the phase A power inverter; $B_1$ and $B_0$ refer to the "1" and "0" states of flip-flop circuit 124, associated with the phase B power inverter; and $C_1$ and $C_0$ refer to the "1" and "0" states of flip-flop circuit 125, associated with the phase C power inverter. The symbols $a_1$ and $a_0$ refer to AND circuits 126 and 127 which are associated with the set and reset inputs of the phase A flip-flop circuit 123. Similarly, symbols $b_1$, $b_0$, $c_1$, $c_0$ refer to AND circuits 128–131, respectively. The first line of Table II, for example, indicates that, when flip-flop circuit 123 is in the "1" state ($A_1$), AND circuit 129 ($b_0$) and AND circuit 130 ($c_1$) each has one input energized as indicated by the x's. Thus, lines 1–6 in Table II indicate which AND circuits are conditioned when a flip-flop circuit is in a particular state.

TABLE II

|  |  | $a_1$ | $a_0$ | $b_1$ | $b_0$ | $c_1$ | $c_0$ |
|---|---|---|---|---|---|---|---|
| 1 | $A_1$ |  |  |  |  | x | x |
| 2 | $A_0$ |  |  | x |  |  | x |
| 3 | $B_1$ | x |  |  |  | x |  |
| 4 | $B_0$ |  | x |  |  | x |  |
| 5 | $C_1$ |  | x | x |  |  |  |
| 6 | $C_0$ | x |  |  | x |  |  |
| 7 | $A_1$–$B_0$–$C_0$ | x | x |  |  | xx | xx |
| 8 | $A_1$–$B_0$–$C_1$ |  | xx | x |  | x | xx |
| 9 | $A_0$–$B_0$–$C_1$ |  | xx | xx |  |  | x | x |
| 10 | $A_0$–$B_1$–$C_1$ | x | x |  | xx |  |  | xx |
| 11 | $A_0$–$B_1$–$C_0$ | xx |  |  | x | x |  | xx |
| 12 | $A_1$–$B_1$–$C_0$ | xx |  |  |  | xx | x | x |
| 13 | $A_1$–$B_0$–$C_0$ |  |  |  |  |  |  |

The purpose of the flip-flop circuits 123–125 and AND circuits 117–122 and 126–131 is to provide the three-phase timing signals for power inverters 144–146. The pulses emerging from multivibrator 116 at a frequency 6f are routed to the inputs of flip-flop circuits 123–125 by means of AND circuits 117–122 so that the flip-flop circuits provide a three-phase timing signal at a frequency f. AND circuits 126–131 and delay circuits 132–137 condition AND circuits 117–122 in proper timed sequence. This sequence is established and maintained in accordance with the state of binary circuits 123–125.

Time delay circuits 132–137 are each adjusted to provide a delay somewhat less than the time interval between successive pulses emerging from multivibrator circuit 116. It should be noted that when a pulse passes through one of the conditioned AND circuits 117–122, this pulse may change the state of one of the flip-flop circuits 123–125, which in turn causes different ones of AND circuits 117–122 to be conditioned via AND circuits 126–131. As a result, the pulse from multivibrator circuit 116 could be split and improperly change the states of flip-flop circuits 123–125. Delay circuits 132–137 provide sufficient delay to prevent such pulse splitting.

The lower portion of Table II, i.e., lines 7–13, shows the conditions of AND circuits 126–131 when all three flip-flop circuits 123–125 are considered. If flip-flop circuit 123 is in the "1" state ($A_1$), and at the same time flip-flop circuit 124 is in the "0" state ($B_0$) and flip-flop circuit 125 is in the "0" state ($C_0$), AND circuits 126 and 127 each have one input energized and AND circuits 129 and 130 each have both of their inputs energized, as indicated in the sixth line of Table II. AND circuits 120 and 121 are therefore conditioned by AND circuits 129 and 130, respectively, and, therefore, the next pulse from multivibrator circuit 116 passes through AND circuits 129 and 130 to energize the reset input of flip-flop circuit 124 and the set input of flip-flop circuit 125. According to the initial conditions in line 6 of Table II, the flip-flop circuit 124 is already in the "0" state, and will be unaffected by the signal applied to the reset input. However, the flip-flop circuit 125 was initially in the "0" state, and therefore the signal applied to the set input causes that binary to change to the "1" state. The conditions of flip-flop circuits 123–125 are then represented by $A_1$–$B_0$–$C_1$, as shown in line 8 of Table II. The next incoming pulse from multivibrator 116 therefore passes through AND circuits 118 and 121, causing flip-flop circuit 123 to change to the "0" state, the pulse passing through AND circuit 121 being ineffective to change the state of flip-flop circuit 125. The conditions of the flip-flop circuits is therefore $A_0$–$B_0$–$C_1$, as indicated in line 9.

The three flip-flop circuits continue to change state in this manner, following the sequence indicated in Table II. The particular AND circuit which will effect a change of state in one of the flip-flop circuits is marked by a double x underlined (xx). Note that the condition of the flip-flop circuits is the same in lines 7 and 13, and therefore the sequence repeats after every six applied pulses.

If all of the flip-flop circuits are in the same state when the equipment is initially energized, i.e., either all in the "1" state or all in the "0" state (the remaining two possible combinations), each of AND circuits 126–131 will have only one input energized and therefore none of AND circuits 117–122 becomes conditioned. Starting circuitry (not shown) is therefore required to assure that one of the flip-flop circuits is in a different state from the other two when the equipment commences operation. Thereafter, the cycle of operation will proceed as described in Table II.

The power inverters 144–146, not shown in detail in this application, are solid state switching devices for the control of large amounts of power by relatively small control signals.

In general, each of these inverter circuits may be thought of as including four relay devices connected to operate in pairs so that when the associated one of flip-flop circuits 123–125 is in the "1" state, one pair of relay devices completes a path for current flow through the motor winding in one direction, and so that when the associated flip-flop circuit is in the "0" state, the other pair of relay devices completes a path for current flow through the same winding, but in the opposite direction.

Considering now the output signals from inverter circuits 144–146 and the flip-flop circuits 123–125, and referring to FIG. 8, the relationship can be seen between the energy supplied at frequency f to three-phase motor 12 and the output of multivibrator 116 at frequency 6f. The four parts of FIG. 8 are drawn to the same time scale, so that at the time of the pulse 160, flip-flop circuit 123 changes to the "1" state, the flip-flop circuit 125 is in the "0" state, and the flip-flop circuit 124 is in the "1" state. This corresponds to the condition $$A_1\text{–}B_1\text{–}C_0$$

shown in line 12 of Table II. The next applied pulse 161 arrives at a time when AND gate 120 is conditioned, as indicated in line 12, so that the flip-flop circuit 124 changes from the "1" state to the "0" state. The output from power inverter 145 changes from positive to negative or, in other words, the phase B potential changes from positive to negative. The binary circuits 123–125 are now in the condition $A_1$–$B_0$–$C_0$, as indicated in lines 13 and 1 in Table II. Pulse 162 then causes flip-flop circuit 125 to change to the "1" state, and the C inverter circuit 146 therefore changes from a negative to a positive output potential as applied to the A.C. motor. Pulse 163 causes the flip-flop circuit 123 to change state and therefore the A inverter circuit 144 changes its output from positive to negative. The operation continues in this fashion, following the sequence set forth in Table II.

It is therefore apparent that six pulses from the pulse train provided by multivibrator circuit 116 are necessary to cause one complete cycle of operation for power inverter circuits 144–146. As is indicated in FIG. 8, the three outputs from inverter circuits 144–146 are displaced from one another by 120 electrical degrees, and, hence, the A.C. motor is energized by a three-phase square wave signal having a basic frequency f.

It is desirable to regulate the power supplied to the motor 12 by the power inverters 144–146 so that the motor torque will be constant over the relatively wide frequency range used. For this purpose, the rectifier and regulator circuit 10 is connected between the source of A.C. power and the power inverters 144–146, to rectify the A.C. power to smooth D.C. power and to regulate the level of that D.C. A reference level signal is connected to terminal 141 of rectifier-regulator 10, which is directly proportional to the frequency of the signal supplied to the power inverters The signal which appears at terminal 153 is a D.C. signal representative of the actual A.C. potential across the windings of motor 12.

The A.C. level sensing circuit includes three semiconductor diodes 147-149 having a common cathode connection connected to input terminal 153 of regulator 10 A resistor 150 and a parallel filter capacitor 151 are connected between the common cathode connection and ground. The anodes of diodes 147-149 are each connected to leads going to three phase motor 12. The diodes provide a pulsating D.C. signal across resistor 150 which is proportional to the potential appearing across the motor winding. This pulsating signal is smoothed by filter capacitor 151 and a corresponding smooth D.C. signal is applied at terminal 153.

The D.C. level control circuit provides a D.C. signal at terminal 140 of regulator circuit 10 which is proportional to the frequency $f$ which appears on the set output of flip-flop circuit 123. The level control circuit includes a saturable transformer 138 having a primary winding connected between the set output of flip-flop circuit 123, via a capacitor 154, and ground. One end of the secondary winding of saturable transformer 138 is connected to ground and the other end is connected to terminal 141 via a diode 139 and an integrating circuit 140 connected in series. A diode 140 is connected in series with a resistor 143 and this series combination is connected across the secondary winding of saturable transformer 138.

The saturable transformer is designed so that it is always driven into saturation in the time interval during which flip-flop circuit 123 is in the set state, regardless of the frequency $f$ being applied to motor 12. Diode 139 is connected so that the potential appearing across the secondary winding under these circumstances is applied to integrating circuit 140. Accordingly, a pulse is applied to integrating circuit 140 each time flip-flop circut 123 is placed in the "1" state. The magnitude of each such pulse is determined by the volt-time integral characteristic of the saturable transformer and is independent of the length of time during which flip-flop circuit 123 is in the "1" state. The interval between successive pulses, however, is a function of the frequency $f$. Integrating circuit 140 provides a D.C. signal proportional to the average value of the pulses derived via diode 139 and therefore, since the magnitude of each of the successive pulses is the same, and since the interval between successive pulses is a function of frequency, the amplitude of the D.C. signal appearing at terminal 141 is directly proportional to frequency. Diode 142 is connected to provide a path for current flow while the saturable transformer is being reset when flip-flop circuit 123 is in the reset state.

The regulator circuit 10 is of conventional design and operates in response to the signals applied at terminals 141 and 153. The signal at terminal 153 represents the actual potential across the motor winding whereas the signal at terminal 141 represents the desired potential for the motor windings. The regulator circuit operates to adjust the level of the D.C. potential applied to power inverter circuits 144-146 until the potential at terminal 153 coincides with that at terminal 141.

*Computer circuits*

The various circuits shown in block form in FIGS. 3-5 are conventional circuits for which suitable design can be derived from any number of commonly available handbooks.

The flip-flop circuits are bistable circuits which can assume either the "1" state or the "0" state also referred to as the set and reset states, respectively. When a signal is applied to the set input, the flip-flop circuit is placed in the set state and provides an output signal on the set output. When an input signal is applied on the reset input, the flip-flop circuit is placed in the reset state and provides an output signal on the reset output. Whenever a pulse is applied to the symmetrical input of a flip-flop circuit, the circuit changes to the alternate state.

A single shot multivibrator circuit has a stable state and an astable state. The circuit is normally in the stable state, but when a pulse is applied, the circuit momentarily assumes the astable state, and then after a predetermined period of time automatically reverts back to the stable state. The multivibrator circuit provides an output signal while in the astable state, and hence the duration of the output pulse provided by the circuit can be controlled by suitable adjustment of the internal time constants of the circuit.

The AND circuits include two inputs and a single output. When a potential is applied to both of the inputs simultaneously, the AND circuit provides an output signal. The various AND circuits shown in the drawings differ somewhat from one another in design since some of the AND circuit inputs accommodate a D.C. level signal and other inputs accommodate A.C. pulse signals. AND circuits 50-56 in FIG. 3, AND circuits 90-99 in FIG. 4, and AND circuits 117-122, each have one input adopted to receive a D.C. level, and the other input adapted to receive an A.C. pulse signal. Thus, these AND circuits act as gate circuits which permit the A.C. pulse trains to pass through when the D.C. input is energized. AND circuits 126-131 are designed so that both inputs are responsive to D.C. level signals.

OR circuits are capable of providing an output signal when any one of the inputs is energized. Therefore, the OR circuits shown in FIGS. 3 and 4 perform the function of combining the various pulse trains applied to the inputs thereof.

The remaining circuits and components shown in FIGS. 3-5 have previously been described in detail, and hence the description of these components is not repeated.

While only one specific embodiment of the invention has been described in detail, it should be obvious that there are numerous variations of the system within the concept of this invention. It is specifically pointed out that the binary counter (FIG. 3) including flip-flop circuits 60-66 is shown as a binary counter which counts in the reverse direction, i.e., toward "0." With this type of counter, the output frequency could be decreased at a desired slope, but the frequency could not be increased. The system, however, could be easily modified to include a counter which counts in the opposite direction, or by means of a counter which counts in either direction. These types of binary counters are well known in the art and are therefore not described in detail. However, it can be seen that the present invention is not limited to a system achieving only a negative frequency slope. The invention is more specifically defined in the appended claims.

What is claimed is:
1. In a variable frequency power supply, the combination of
a fixed frequency oscillator;
a plurality of frequency divider circuits serially connected to said oscillator,
each of said frequency divider circuits being operable to provide a train of pulses having a different repetition rate, each such repetition rate bearing a fixed relationship to the operating frequency of said oscillator;
said frequency divider circuits being interconnected so that no pulse of any one of said pulse trains is coincident in time with any pulse of any other one of said pulse trains;
first circuit means connected to a first selected group of said frequency divider circuits and selectively operable to provide a single pulse train including pulses corresponding in time to
pulses in a selected one of said pulse trains provided by said first selected group frequency divider circuits connected thereto, or
pulses in any selected combination of more than one of said pulse trains provided by said first selected group of frequency divider circuits connected thereto; and second circuit means connected to a different group of said frequency divider circuits and to said first circuit means and being operable to selectively operate and change incrementally change the frequency of pulses emerging from said first circuit means at a preselected rate.

2. A variable frequency power supply in accordance with claim 1 wherein said first circuit means comprises a combining circuit operable to provide a single pulse train including pulses corresponding in time to pulses applied thereto, a plurality of conditionable gating circuits each connected to a different one of said first selected group of frequency divider circuits and individually operable, when conditioned, to apply the pulse train from the connected frequency divider circuit to said combining circuit; and a binary counter including a plurality of individual stages each connected to a different one of said gating circuits to selectively condition the same according to the count therein.

3. A variable frequency power supply in accordance with claim 2 wherein said second circuit means comprises another combining circuit connected to provide a single pulse train to said binary counter including pulses corresponding in time to pulses applied thereto to change the count in said binary counter; and a plurality of other, conditionable gating circuits each associated with a different one of said different group of frequency divider circuits and individually operable to selectively apply to said other combining circuit the pulse train from the connected frequency divider circuit.

4. In a programmable, variable frequency power supply, the combination of means for providing
    a first numerical instruction corresponding to a preselected starting frequency,
    a second numerical instruction corresponding to a preselected termination frequency, and
    a third numerical instruction corresponding to a preselected rate of frequency change between said starting and said termination frequencies;

a crystal controlled, fixed frequency oscillator, a plurality of frequency divider circuits serially connected to said oscillator,
    each of said frequency divider circuits being operable to provide a train of pulses having a different repetition rate, each such repetition rate bearing a fixed relationship to the operating frequency of said oscillator;

said frequency divider circuits being interconnected so that no pulse of any one of said pulse trains is coincident in time with any pulse of any other one of said pulse trains;

a combining circuit operative to provide an output signal including pulses corresponding in time to pulses applied thereto;

a plurality of first, conditionable gating circuits each connected to a different one of said frequency divider circuits and operable, when conditioned, to apply the pulse train from the associated frequency divider circuit to said combining circuit;

a binary counter connected to condition selected ones of said gating circuits in accordance with the existing count in said counter;

a plurality of second, conditionable gating circuits each connected to a different one of said frequency divider circuits and operable, when conditioned, to apply the pulse train from the associated frequency divider to said binary counter to change the count therein accordingly;

first circuit means for establishing an initial count in said binary counter equal to said first numerical instruction;

second circuit means for indicating when the count in said binary counter is equal to said second numerical instruction; and third circuit means for conditioning selected ones of said second plurality of gating circuits in accordance with said third numerical instruction.

5. In a system for controlling the speed of an A.C. motor, the combination of a controllable source of D.C. power;

an inverter circuit means for converting power from said D.C. source into A.C. energy suitable for application to the A.C. motor;

a fixed frequency oscillator;

a plurality of frequency dividers serially connected to said oscillator and each operable to provide a pulse train having a different pulse repetition rate, none of the pulses in said pulse trains being coincident in time;

a combining circuit for providing a train of pulses including pulses corresponding in time to pulses applied thereto;

first circuit means selectively operable to apply a selected one, or selected combination, of pulse trains from said frequency dividers to said combining circuit;

second circuit means responsive to the pulse train provided by said combining circuit and operable to synchronize the operation of said inverter circuit means in accordance with the same;

third circuit means operably connected to control the potential supplied by said source as a function of the operating frequency of said inverter circuit means; and fourth circuit means connected to and selectively operating said first circuit means to vary the pulse trains applied to said combining circuit to thereby cause an incremental change at a preselected rate in the speed of rotation of the motor.

6. A system in accordance with claim 5 adapted to control the speed of a three phase A.C. motor, wherein said inverter circuit means comprises three inverter circuits each operable to provide one phase of the three phase A.C. energy applied to the motor, said second circuit means includes circuit means for providing three individual synchronizing signals for maintaining said inverter circuits in three phase synchronized operation.

7. Apparatus in accordance with claim 5 wherein said first circuit means comprises
    a plurality of gating circuits each associated with a different one of said frequency divider circuits and operable to apply the pulse train from the associated frequency divider to said combining circuit when conditioned, and
    a binary counter having a plurality of individual stages each associated with a different one of said gating circuits, said counter being operable to condition selected ones of said gating circuits in accordance with the count therein, whereby the speed of rotation of said motor is a function of the count in said binary counter.

8. Apparatus in accordance with claim 7 wherein said fourth circuit means is connected to and applies pulses to said binary counter at a preselected rate to thereby bring about such incremental change in the speed of rotation of the motor.

9. Apparatus in accordance with claim 8 wherein said fourth circuit means comprises a plurality of frequency dividers serially connected to said oscillator and each operable to provide a pulse train having a different pulse repetition rate, none of said pulses in said pulse trains being coincident in time; and a plurality of gating circuits each associated with a different one of said frequency divider circuits and operable to apply the pulse train from the associated frequency divider circuit to said binary counter.

10. Apparatus in accordance with claim 9 further comprising means for providing a numerical instruction corresponding to a preselected rate of motor speed change, and circuit means for conditioning selected ones of said gating circuits in said fourth circuit means in accordance with said numerical instruction.

11. Apparatus in accordance with claim 9 further comprising means for providing a second numerical instruction corresponding to a preselected starting motor speed, means for providing a third numerical instruction corresponding to a preselected termination motor speed, circuit means for initially establishing a count in said binary counter equal to said second numerical instruction, and circuit means for indicating when the count in said binary counter is equal to said third numerical instruction.

References Cited by the Examiner
UNITED STATES PATENTS

| | | | |
|---|---|---|---|
| 2,784,365 | 3/1957 | Fenemore | 318—227 X |
| 2,953,735 | 9/1960 | Schmidt | 321—5 |
| 3,052,833 | 9/1962 | Coolidge | 321—5 |
| 3,184,663 | 5/1965 | Mergler | 307—88.5 |
| 3,212,010 | 10/1965 | Podlesny | 307—88.5 |

ORIS L. RADER, *Primary Examiner.*

G. A. FRIEDBERG, *Assistant Examiner.*